United States Patent [19]
Levey et al.

[11] Patent Number: 5,826,926
[45] Date of Patent: Oct. 27, 1998

[54] KEG ROLLER

[76] Inventors: Jeff Levey; James Neilson, both of 10 Cornton Rd, Bridge Of Allan, Stirling, Scotland, FK9 4DB

[21] Appl. No.: 970,016

[22] Filed: Nov. 13, 1997

[51] Int. Cl.[6] .................................................. B65G 7/00
[52] U.S. Cl. .............................. 294/4; 294/16; 294/99.1; 294/116
[58] Field of Search .................................. 294/4, 15, 16, 294/27.1, 28, 33, 31.1, 99.1, 106, 116

[56] References Cited

U.S. PATENT DOCUMENTS

| | | | |
|---|---|---|---|
| 420,053 | 1/1890 | Goodrich | 294/4 |
| 551,167 | 12/1895 | Kobold | 294/4 |
| 593,294 | 11/1897 | Cherrington | 294/4 |
| 693,097 | 2/1902 | Baldwin | 294/4 |
| 1,503,347 | 7/1924 | Brunes | 294/16 X |
| 2,273,657 | 2/1942 | Owen | 294/4 |
| 2,589,918 | 3/1952 | Anderson | 294/4 X |

FOREIGN PATENT DOCUMENTS 115421  11/1945  Sweden ..................................... 294/4

*Primary Examiner*—Johnny D. Cherry

[57] ABSTRACT

A keg roller is provided including a handle with a pair of ends and a pair of roller assemblies each mounted to an associated one of the ends of the handle. The roller assemblies are adapted to rotatably engage a keg such that the same may be rolled by the handle.

6 Claims, 2 Drawing Sheets

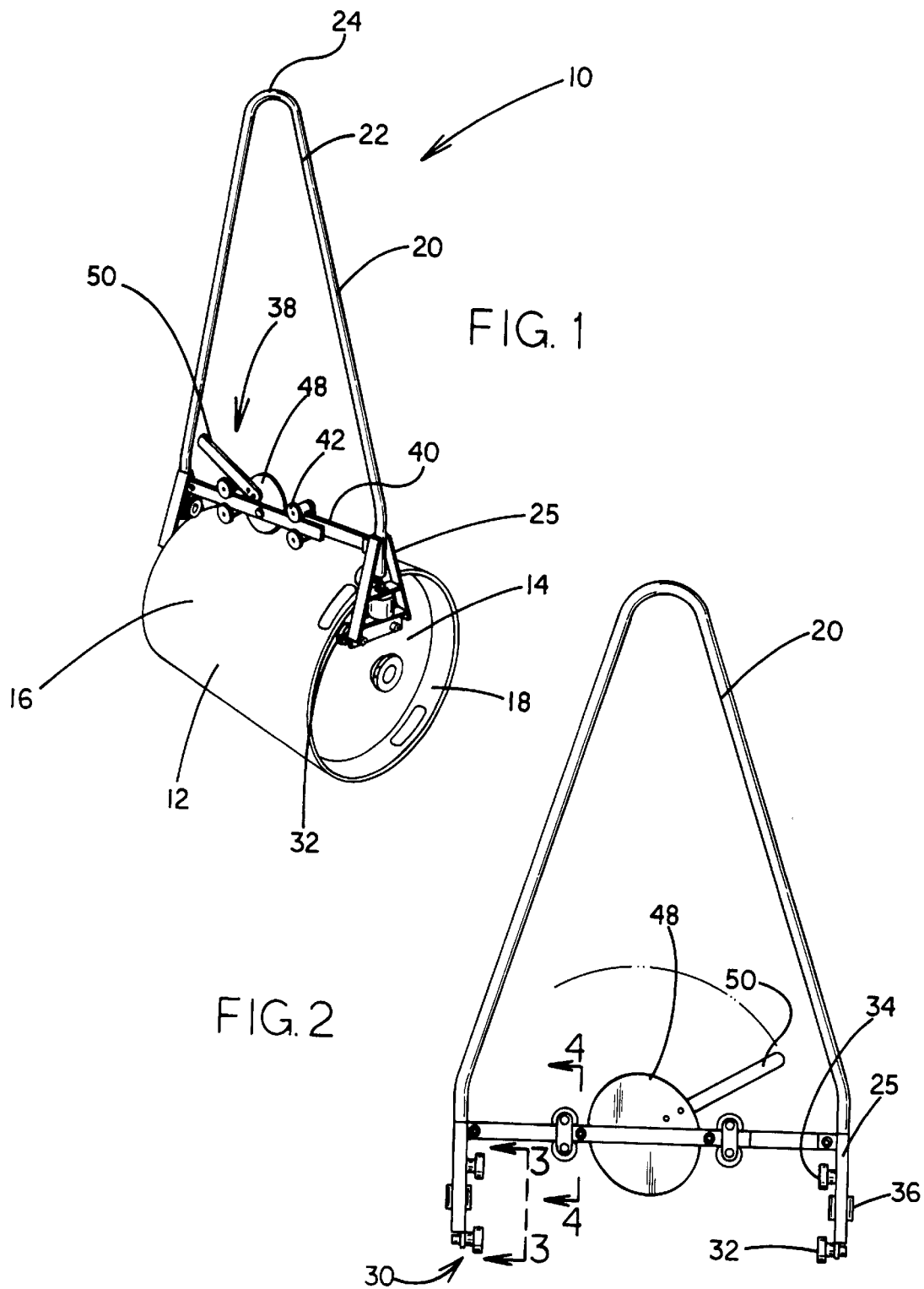

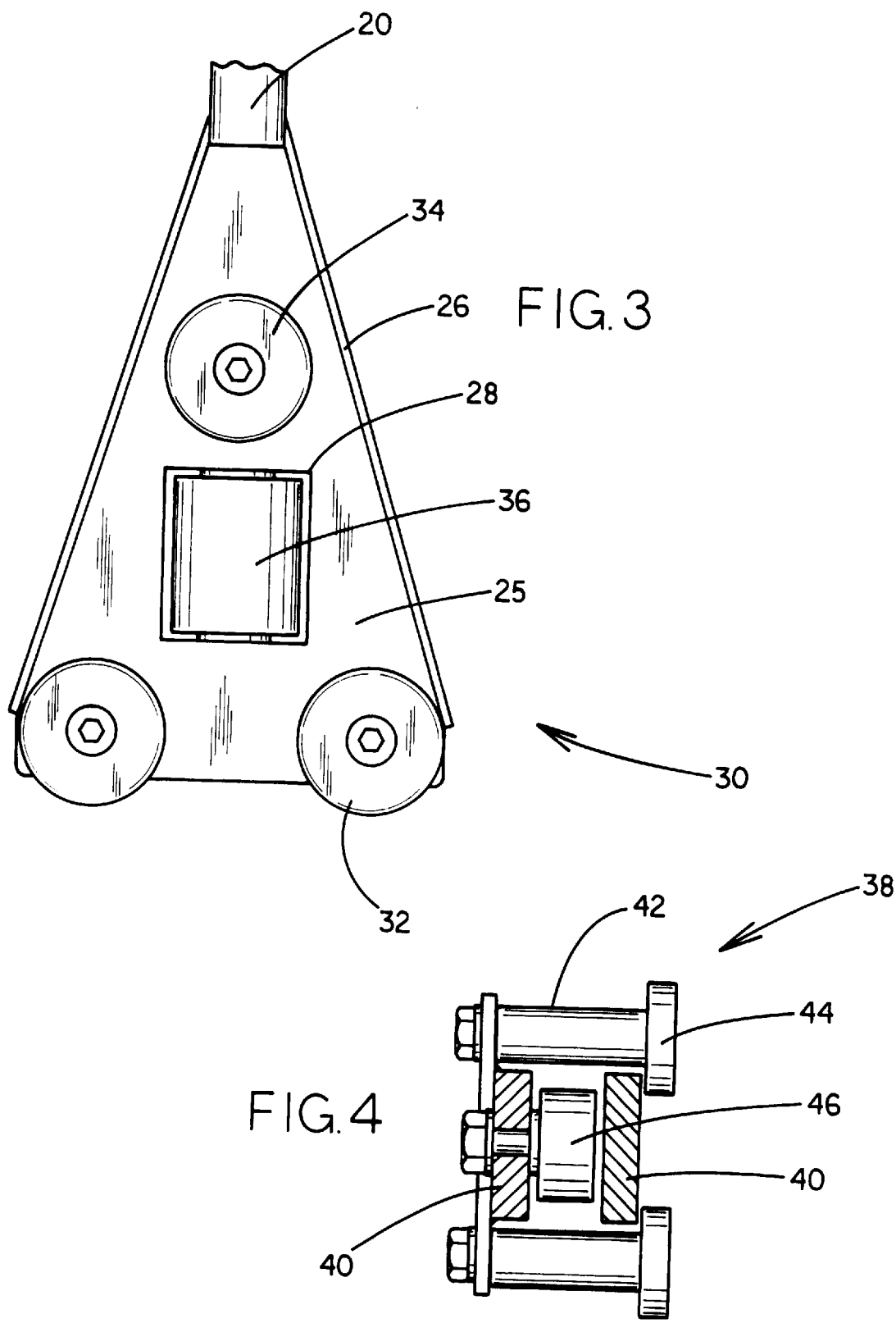

KEG ROLLER

BACKGROUND OF THE INVENTION

1. Field of the Invention

The present invention relates to dollies and more particularly pertains to a new keg roller for rolling a keg with a handle rotatably mounted thereto.

2. Description of the Prior Art

The use of dollies is known in the prior art. More specifically, dollies heretofore devised and utilized are known to consist basically of familiar, expected and obvious structural configurations, notwithstanding the myriad of designs encompassed by the crowded prior art which have been developed for the fulfillment of countless objectives and requirements.

Known prior art dollies include U.S. Pat. No. 5,042,962; U.S. Pat. No. 5,120,183; U.S. Pat. Des. 361,189; U.S. Pat. No. 4,981,412; U.S. Pat. No. 4,685,854; and U.S. Pat. No. 3,938,768.

In these respects, the keg roller according to the present invention substantially departs from the conventional concepts and designs of the prior art, and in so doing provides an apparatus primarily developed for the purpose of rolling a keg with a handle rotatably mounted thereto.

SUMMARY OF THE INVENTION

In view of the foregoing disadvantages inherent in the known types of dollies now present in the prior art, the present invention provides a new keg roller construction wherein the same can be utilized for rolling a keg with a handle rotatably mounted thereto.

The general purpose of the present invention, which will be described subsequently in greater detail, is to provide a new keg roller apparatus and method which has many of the advantages of the dollies mentioned heretofore and many novel features that result in a new keg roller which is not anticipated, rendered obvious, suggested, or even implied by any of the prior art dollies, either alone or in any combination thereof.

To attain this, the present invention generally comprises a keg with a pair of circular faces and a cylindrical periphery formed therebetween. As shown in FIG. 1, the keg has a pair of peripheral lips mounted to a periphery of both circular faces which define an extension of the cylindrical periphery. FIGS. 1 & 2 show a V-shaped handle with a pair of ends including a resilient bar having a circular cross-section. The handle is defined by a pair of linear extents and a tight arcuate extent formed therebetween. During use, the bar is generally flexible so as to allow the ends to be biased away each other, for reasons that will become apparent hereinafter. Next provided is a pair of roller mounting plates each having a planar triangular configuration. An apex of each of the mounting plates is integrally coupled to an associated one of the ends of the handle. As such, the roller mounting plates reside in spaced parallel planes. Each roller mounting plate includes an inner face, an outer face, and a peripheral flange integrally coupled thereto and extending outwardly from the outer face. Each roller mounting plate has a rectangular cut out formed in a central extent thereof. Also included is a pair of roller assemblies each having a pair of lower disk-shaped rollers mounted to the inner face of the corresponding plate adjacent to opposite ends thereof. Associated therewith is a top disk-shaped roller mounted to the inner face of the associated plate adjacent to the apex thereof in coplanar relationship with the lower disk-shaped rollers. As shown in FIG. 3, a cylindrical roller is rotatably mounted within the rectangular cut out. The cylindrical roller has an axis of rotation which bisects a bottom edge of the associated mounting plate and resides perpendicular with respect to axes of rotation of the lower and upper disk-shaped rollers. For selectively biasing the ends of the handle outward such that the roller assemblies may be secured to the keg, a securement mechanism is provided. Such mechanism includes a pair of connector strips each having a first end fixed to an associated one of the ends of the handle. Each connector extends inward in parallel relationship toward an opposite end and terminates in a second free end. A first one of the connector strips has a pair of guide roller pairs rotatably mounted both on an intermediate extent and at the second end thereof. As shown in FIG. 4, each guide roller has a radially extending flange mounted on a free end thereof to define a slot for slidably receiving a second one of the connector strips. The second end of the first connector strip further has a central roller mounted thereon between the associated guide roller pair. As such, lateral movement of the second connector strip is constrained by the central roller and the radially extending flanges of the guide roller pair, as can be seen in FIG. 4. Shown in FIGS. 1 & 2 is a cam with a handle including an elliptical plate rotatably coupled at a central extent of the second connector strip. The plate is adapted for engaging the central roller and biasing the ends of the handle and the roller assemblies outward upon the rotation thereof. By this structure, the elliptical plate may be released such that the top disk-shaped roller of each roller assembly abuts an exterior surface of the periphery of the keg, the lower disk-shaped rollers of the each roller assembly abut an interior surface of the corresponding peripheral lip of the keg, and the cylindrical roller abuts the associated one of the faces of the keg. This engagement allows the keg to be rolled with the handle being fixed in relation to an axis of rotation of the keg.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new keg roller apparatus and method which has many of the advantages of the dollies mentioned heretofore and many novel features that result in a new keg roller which is not anticipated, rendered obvious, suggested, or even implied by any of the prior art dollies, either alone or in any combination thereof.

It is another object of the present invention to provide a new keg roller which may be easily and efficiently manufactured and marketed.

It is a further object of the present invention to provide a new keg roller which is of a durable and reliable construction.

An even further object of the present invention is to provide a new keg roller which is susceptible of a low cost of manufacture with regard to both materials and labor, and which accordingly is then susceptible of low prices of sale to the consuming public, thereby making such keg roller economically available to the buying public.

Still yet another object of the present invention is to provide a new keg roller which provides in the apparatuses and methods of the prior art some of the advantages thereof, while simultaneously overcoming some of the disadvantages normally associated therewith.

Still another object of the present invention is to provide a new keg roller for rolling a keg with a handle rotatably mounted thereto.

Even still another object of the present invention is to provide a new keg roller that includes a handle with a pair of ends and a pair of roller assemblies each mounted to an associated one of the ends of the handle. The roller assemblies are adapted to rotatably engage a keg such that the same may be rolled by the handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new keg roller according to the present invention.

FIG. 2 is a front view of the present invention.

FIG. 3 is a close-up view along line 3—3 of FIG. 2 of one of the roller assemblies of the present invention.

FIG. 4 is a cross-sectional view along line 4—4 of FIG. 2 of the connector mechanism of the present invention.

DESCRIPTION OF THE PREFERRED EMBODIMENT

With reference now to the drawings, and in particular to FIGS. 1 through 4 thereof, a new keg roller embodying the principles and concepts of the present invention and generally designated by the reference numeral 10 will be described.

The present invention, as designated as numeral 10, includes a keg 12 with a pair of circular faces 14 and a cylindrical periphery 16 formed therebetween. As shown in FIG. 1, the keg has a pair of peripheral lips 18 mounted to a periphery of both circular faces which define an extension of the cylindrical periphery.

FIGS. 1 & 2 show a V-shaped handle 20 formed from a resilient bar having a circular cross-section and a pair of ends. The handle is defined by a pair of linear extents 22 and a tight arcuate extent 24 formed therebetween. During use, the bar is generally flexible so as to allow the ends to be biased away from each other, for reasons that will become apparent hereinafter. In the preferred embodiment, the linear extents define an angle of approximately 30 degrees.

Next provided is a pair of roller mounting plates 25 each having a planar triangular configuration. An apex of each of the mounting plates is integrally coupled to an associated one of the ends of the handle. As such, the roller mounting plates reside in spaced parallel planes. Each roller mounting plate includes an inner face, an outer face, and a peripheral flange 26 integrally coupled thereto and extending outwardly from the outer face for strengthening purposes. Each roller mounting plate has a rectangular cut out 28 formed in a central extent thereof.

Also included is a pair of roller assemblies 30 each having a pair of thin lower disk-shaped rollers 32 mounted to the inner face of the corresponding plate adjacent to opposite ends thereof. Associated therewith is a thin top disk-shaped roller 34 mounted to the inner face of the associated plate adjacent to the apex thereof in coplanar relationship with the lower disk-shaped rollers. As shown in FIG. 3, a cylindrical roller 36 is rotatably mounted within the rectangular cut out. The cylindrical roller has an axis of rotation which bisects a bottom edge of the associated mounting plate and resides perpendicular with respect to axes of rotation of the lower and upper disk-shaped rollers.

For selectively biasing the ends of the handle outward such that the roller assemblies may be removably secured to the keg, a securement mechanism 38 is provided. Such mechanism includes a pair of connector strips 40 each having a first end fixed to an associated one of the ends of the handle. Each connector extends inward in parallel relationship toward an opposite end and terminates in a second free end. A first one of the connector strips has two guide roller pairs 42 rotatably mounted both on an intermediate extent and at the second end thereof. As shown in FIG. 4, each guide roller has a radially extending flange 44 mounted on a free end thereof to define a slot for slidably receiving a second one of the connector strips.

The second end of the first connector strip further has a central roller 46 mounted thereon between the associated guide roller pair. As such, lateral movement of the second connector strip is constrained by the central roller and the radially extending flanges of the guide roller pair, as can be seen in FIG. 4.

Shown in FIGS. 1 & 2 is a cam 48 with a handle 50 including an elliptical plate rotatably coupled at a central extent of the second connector strip. The plate is adapted for engaging the central roller and biasing the ends of the handle and the roller assemblies outward upon the rotation thereof. As an option, another central roller may be included opposite the first central roller to preclude over-rotation of the cam.

By this structure, the elliptical plate may be released such that the top disk-shaped roller of each roller assembly abuts an exterior surface of the periphery of the keg, the lower disk-shaped rollers of the each roller assembly abut an interior surface of the corresponding peripheral lip of the keg, and the cylindrical roller abuts the associated one of the faces of the keg. This engagement allows the keg to be rolled with the handle being fixed in relation to an axis of rotation of the keg.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A keg roller comprising, in combination:

a keg with a pair of circular faces and a cylindrical periphery formed therebetween, the keg having a pair of peripheral lips mounted to a periphery of both circular faces and defining an extension of the cylindrical periphery;

a V-shaped handle with a pair of ends including a resilient bar with a circular cross-section having a pair of linear extents and a tight arcuate extent formed therebetween, the bar being generally flexible so as to allow the ends to be biased away from each other;

a pair of roller mounting plates each having a planar triangular configuration with an apex integrally coupled to an associated one of the ends of the handle such that the roller mounting plates reside in spaced parallel planes, each roller mounting plate including an inner face, an outer face, and a peripheral flange integrally coupled thereto and extending outwardly from the outer face, wherein each roller mounting plate has a rectangular cut out formed in a central extent thereof;

a pair of roller assemblies each including a pair of lower disk-shaped rollers mounted to the inner face of the corresponding plate adjacent to opposite ends thereof, a top disk-shaped roller mounted to the inner face of the associated plate adjacent to the apex thereof in coplanar relationship with the lower disk-shaped rollers, and a cylindrical roller rotatably mounted within the rectangular cut out and having an axis of rotation which bisects a bottom edge of the associated mounting plate and resides perpendicular with respect to axes of rotation of the lower and upper disk-shaped rollers;

a securement mechanism including a pair of connector strips each having a first end fixed to an associated one of the ends of the handle and extending inward in parallel relationship toward an opposite end and a second free end, a first one of the connector strips having a pair of guide roller pairs rotatably mounted both on an intermediate extent and at the second end thereof with each pair of guide rollers having a radially extending flange mounted on a free end thereof to define a slot for slidably receiving a second one of the connector strips, the second end of the first connector strip further having a central roller mounted thereon between the associated guide roller pair such that lateral movement of the second connector strip is constrained by the central roller and the radially extending flanges of the guide roller pair; and a cam with a handle including an elliptical plate rotatably coupled at a central extent of the second connector strip for engaging the central roller and biasing the ends of the handle and the roller assemblies outward upon rotation thereof, whereby the elliptical plate may be released such that the top disk-shaped roller of each roller assembly abuts an exterior surface of the periphery of the keg, the lower disk-shaped rollers of each roller assembly abut an interior surface of the corresponding peripheral lip of the keg, and the cylindrical roller abuts the associated one of the faces of the keg thereby allowing the keg to be rolled with the handle being fixed in relation to an axis of rotation of the keg.

2. A keg roller for use with a keg with a pair of circular faces and a cylindrical periphery formed therebetween, the keg having a pair of peripheral lips mounted to a periphery of both circular faces and defining an extension of the cylindrical periphery, the keg roller comprising:

a handle with a pair of ends; and a pair of roller assemblies each mounted to an associated one of the ends of the handle, wherein the roller assemblies are adapted to rotatably engage the keg;

wherein the handle is capable of allowing the ends to be biased outwardly and further included is a cam for separating the ends of the handle via the rotation of an arm extending radially from the cam, wherein the cam is mounted between a pair of connector strips which are in turn mounted between the ends of the handle.

3. A keg roller as set forth in claim 2 wherein the roller assemblies each include at least one lower roller for engaging an inner surface of the associated peripheral lip of the keg.

4. A keg roller as set forth in claim 2 wherein the roller assemblies each include a top roller for engaging an outer surface of the periphery of the keg.

5. A keg roller as set forth in claim 2 wherein the roller assemblies each include a cylindrical roller for engaging the corresponding circular face of the keg.

6. A keg roller as set forth in claim 2 wherein the handle is V-shaped.

* * * * *